(12) United States Patent
Shimada et al.

(10) Patent No.: US 11,925,141 B2
(45) Date of Patent: Mar. 12, 2024

(54) MULCHING MOWER DECK WITH REAR DISCHARGE FEATURES

(71) Applicant: Kubota Corporation, Osaka (JP)

(72) Inventors: Ryo Shimada, Sakai (JP); Yusaku Matsuoka, Sakai (JP)

(73) Assignee: Kubota Corporation, Osaka (JP)

( * ) Notice: Subject to any disclaimer, the term of this patent is extended or adjusted under 35 U.S.C. 154(b) by 410 days.

(21) Appl. No.: 17/077,525

(22) Filed: Oct. 22, 2020

(65) Prior Publication Data

US 2021/0274707 A1    Sep. 9, 2021

(30) Foreign Application Priority Data

Mar. 5, 2020    (JP) ................................. 2020-037813

(51) Int. Cl.
| | | |
|---|---|---|
| *A01D 34/71* | (2006.01) | |
| *A01D 34/00* | (2006.01) | |
| *A01D 34/66* | (2006.01) | |
| *A01D 34/73* | (2006.01) | |
| *A01D 34/74* | (2006.01) | |
| *A01D 101/00* | (2006.01) | |

(52) U.S. Cl.
CPC ............ *A01D 34/71* (2013.01); *A01D 34/66* (2013.01); *A01D 34/73* (2013.01); *A01D 34/005* (2013.01); *A01D 34/667* (2013.01); *A01D 34/74* (2013.01); *A01D 2101/00* (2013.01)

(58) Field of Classification Search
CPC ...... A01D 34/71; A01D 34/73; A01D 34/005; A01D 34/667; A01D 34/74; A01D 2101/00; A01D 34/66; A01D 34/661; A01D 34/662

See application file for complete search history.

(56) References Cited

U.S. PATENT DOCUMENTS

| | | | |
|---|---|---|---|
| 4,901,508 A * | 2/1990 | Whatley | ............ A01D 34/863 56/235 |
| 5,251,430 A | 10/1993 | Matsumoto et al. | |
| 5,791,132 A * | 8/1998 | Wiedenmann | ....... A01D 34/005 56/320.1 |
| 6,681,553 B2 | 1/2004 | Ferree et al. | |

(Continued)

FOREIGN PATENT DOCUMENTS

| | | |
|---|---|---|
| EP | 3329759 A2 | 6/2018 |
| JP | 2000201518 A | 7/2000 |

(Continued)

*Primary Examiner* — Alicia Torres
(74) *Attorney, Agent, or Firm* — The Webb Law Firm

(57) ABSTRACT

A mower deck is disclosed. The mower deck includes a housing having a top wall, at least one blade rotated downwardly of the top wall and about a vertical shaft, and a blade baffle unit extending downwards from the top wall in such a manner as to surround an outer circumferential area of a rotational path of the blade to create therein a mulching blade rotation space, the blade baffle unit having a front baffle located on an advancing side of the traveling vehicle and a rear baffle located on a reversing side of the traveling vehicle. The front baffle extends downwards from the top wall to exceed the rotational path so as to prevent discharge of cut grass pieces via a lower end of the front baffle. The rear baffle extends downwards from the top wall by such an extent to allow discharge of the cut grass pieces.

5 Claims, 5 Drawing Sheets

(56) References Cited

U.S. PATENT DOCUMENTS

| | | |
|---|---|---|
| 2003/0051457 A1 | 3/2003 | Ferree et al. |
| 2006/0230735 A1 | 10/2006 | Samejima et al. |
| 2011/0197419 A1* | 8/2011 | Melone .................. A01D 34/64 <br> 29/428 |
| 2019/0150359 A1 | 5/2019 | Gust et al. |
| 2020/0281117 A1 | 9/2020 | Smeets |
| 2020/0337231 A1* | 10/2020 | Kelly .................. A01D 34/005 |

FOREIGN PATENT DOCUMENTS

| | | |
|---|---|---|
| JP | 2006246749 A | 9/2006 |
| KR | 1020190074333 A | 6/2019 |
| WO | 2019051154 A1 | 3/2019 |

* cited by examiner

MULCHING MOWER DECK WITH REAR DISCHARGE FEATURES

CROSS-REFERENCE TO RELATED APPLICATION

This application claims priority to Japanese Patent Application No. 2020-037813 filed Mar. 5, 2020, the disclosure of which is hereby incorporated by reference in its entirety.

BACKGROUND OF THE INVENTION

Field of the Invention

A mower deck is a device mounted in a traveling vehicle for carrying out a grass cutting (mowing) work with a rotating blade. As work types of mower deck, there are a side discharge type configured to discharge cut grass pieces cut by the blade from a side portion of a housing, a rear discharge type configured to discharge the cut grass pieces cut by the blade from a rear portion of the housing, and a mulching type configured to further cut the cut grass pieces once cut by the blade for a plurality of times additionally and then allowing them to be dropped down. The art has provided mower decks designed to be dedicated to the three respective types. The art has provided also a mower deck which can be changed in design selectively into the respective types of mower deck, with attachment of a special member for the respective type to the mower deck as the basis. The detailed disclosure of U.S. Pat. No. 6,681,553 discloses a mulching type mower deck in which a tubular skirt member (baffle) surrounding a rotational path of the blade consists of a front skirt portion and a rear skirt portion which have different lengths from each other as measured from a top (ceiling) plate. Namely, the front skirt portion extends downwards to a position sufficiently exceeding the blade rotational path in order to surround this blade rotational path completely, whereas the rear skirt portion is provided with a shorter length from the top plate in order to discharge cut grass pieces cut by the blade rearwards. With this, between the lower end of the rear skirt portion and the ground surface, there is created a space which forms a large flow opening. Namely, this mower deck is configured as a type combining the mulching type and the rear discharge type, so the cut grass pieces are discharged from the rear portion of the mower deck also. The detailed disclosure of the European Patent Application Publication No. 3329759 too discloses a mulching type mower deck similar to the mower deck according to the U.S. Pat. No. 6,681,553. In this conventional mower deck too, the ground clearance of the rear plate portion of the mulching baffle plate is set longer (higher) than the ground clearance of the blade, forming a flow opening at is lower end. Thus, cut grass pieces cut by the blade are discharged rearwards.

With the mower decks according to the detailed disclosure of the U.S. Pat. No. 6,681,553 and the detailed disclosure of the European Patent Application Publication No. 3329759, as all or most of cut grass pieces are discharged from the rear side of the mower deck, stagnation of a large amount of cut grass pieces inside the mower deck is prevented. However, since there is generated a flow of cut grass pieces to the rear side of the mower deck with each blade, there occurs a problem that the cut grass pieces discharged in this flow will create or leave a distinct or conspicuous streak on the mowing marks. Then, the object of the present invention is to provide a mower deck of the mulching type that can avoid stagnation of a large amount of cut grass pieces inside the mower deck and that can also suppress formation of such conspicuous streak on the mowing marks.

SUMMARY OF THE INVENTION

A mower deck to be mounted on a traveling vehicle, according to the present invention, comprises:
 a housing having a top wall;
 at least one blade rotated downwardly of the top wall and about a vertical shaft; and
 a blade baffle unit extending downwards from the top wall in such a manner as to surround an outer circumferential area of a rotational path of the blade to create therein a mulching blade rotation space, the blade baffle unit having a front baffle located on an advancing side of the traveling vehicle and a rear baffle located on a reversing side of the traveling vehicle;
 wherein the front baffle extends downwards from the top wall to exceed the rotational path so as to prevent discharge of cut grass pieces via a lower end of the front baffle; and
 wherein the rear baffle extends downwards from the top wall by such an extent to allow discharge of the cut grass pieces.

With the above-described configuration, the lower end of the front baffle of the blade baffle unit which surrounds the outer circumferential area of the rotational path of the blade extends downwards sufficiently to be able to prevent discharge of cut grass pieces. Thus, the cut grass pieces will not be discharged from the front side of the housing, but will be cut by a plurality of times by the blade instead. On the other hand, the vertical length of the rear baffle of the blade baffle unit is set shorter than the vertical length of the front baffle. Namely, the rear baffle extends downwards by such a degree that just allows discharge of cut grass pieces, though by a small amount. With this, a portion of cut grass pieces will be discharged from the rear side of the housing, so stagnation of a large amount of cut grass pieces inside the housing (the mulching blade rotation space) is avoided. Moreover, since only a part of cut grass pieces is discharged from the rear side of the housing, the flow of cut grass pieces inside the housing toward the rear side of the housing is weak, so formation of a conspicuous streak on the mowing marks can be avoided also.

If the vertical length of the rear baffle, namely, the length from the top wall to the lower end of the rear baffle, is too long, this will result in stagnation of a large amount of cut grass pieces inside the housing, so the grass cutting performance will deteriorate. Conversely, if the length of the rear baffle from the top wall to the lower end is too short, this will result in increase in the amount of cut grass pieces discharged from the rear side of the housing, which in turn will lead to formation of a conspicuous streak by the discharged cut grass pieces on the mowing marks. For this reason, the length of the rear baffle from its lower end to the top wall needs to be determined based on experimental and empirical finding. According to the finding made by the present inventors, if the length of the rear baffle from the lower end to the top wall is set shorter by 10 millimeters to 30 millimeters approximately than the length of the front baffle from the lower end to the top wall, a favorable grass cutting performance can be obtained. Then, in order to achieve the optimal grass cutting performance, according to one preferred embodiment of the present invention, the length of the rear baffle from the lower end to the top wall is set shorter by 15 millimeters to 25 millimeters approximately than the length of the front baffle from the lower end to the top wall.

Obtaining the optimal grass cutting performance can sometimes prove difficult with setting of the rear baffle alone. Therefore, according to one preferred embodiment of the present invention, under a grass cutting posture in which a pair of left and right ground contacting wheels provided at a front edge of the housing are placed in contact with the ground surface and supported in suspension by the traveling vehicle via a lift link mechanism, the lift link mechanism can set a lift amount such that a rear end of the rotational path of the blade may be set higher than a front end thereof by several millimeters to about ten millimeters, preferably by 2 millimeters to 12 millimeters. In this case, cut grass pieces can be discharged to the rear side across the entire width of the housing, so that the discharged cut grass pieces will be distributed uniformly on the mowing marks and aesthetically favorable mowing marks can be obtained.

There is known a mower deck configured such that a pair of left and right ground contacting wheels are provided at the front edge of the housing and a pair of left and right skids are provided at the rear edge of the housing. With this mower deck, cut grass pieces will collide the skids and will drop at the locations of these collisions. In order to reduce such dropping locations, the number of the skids should be minimal. For this reason, according to one preferred embodiment of the present invention:

the mower deck further comprises:
  a pair of left and right ground contacting wheels provided at a front edge of the housing with a predetermined spacing therebetween; and
  a single skid provided at a left/right center position of a rear edge of the housing.

With the mower deck of the mulching type, grass pieces cut by a plurality of times need to be dropped downwardly of the blade. For this reason, there is employed a blade which is curved in a complicated three-dimensional shape so as to generate a strong vertical convection flow in association with rotation of the blade. However, since such blade acts to press down planted grass, a cutting leftover tends to occur thereby. Conversely, in e.g. a grass plot which requires flatness of mowing marks, a blade having a long straight cutting edge will be advantageous for obtaining high degree of flatness in the mowing marks. However, generation of rising air current too is needed for the purpose of mulching. For this reason, according to one preferred embodiment of the present invention:

the blade is constituted of a flat plate;
a cutting edge having a length which is equal to or more than ⅕ of the length of the blade is formed from respective outer ends on the opposed sides of the blade toward the vertical shaft; and
on the opposite side of the cutting edge of the blade, there is formed a wind generating portion which is bent upwards to present a triangular shape.

DETAILED DESCRIPTION OF THE PREFERRED EMBODIMENTS

Figure 1:
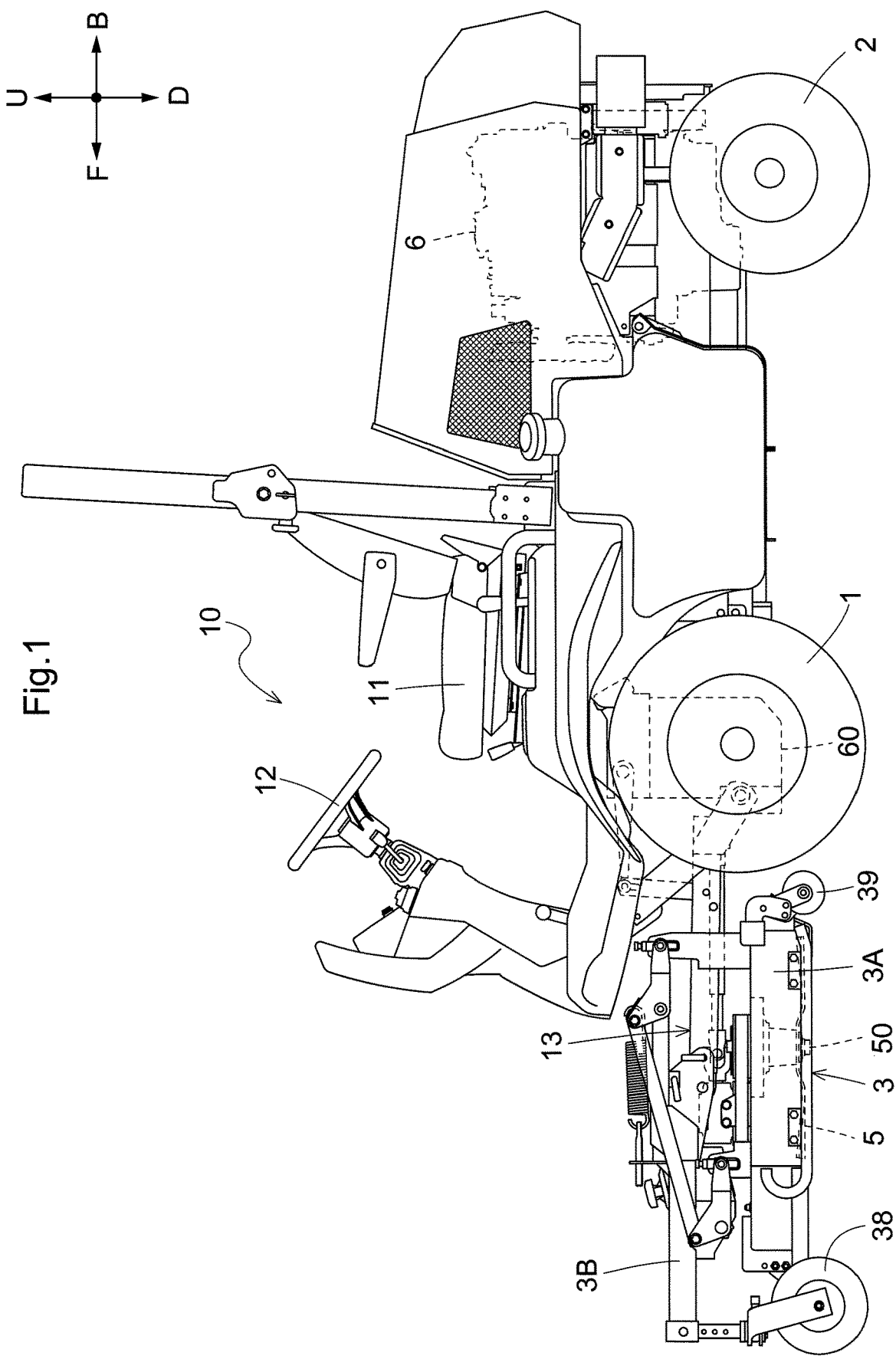
FIG. 1 is a side view showing an entire mower mounting a mower deck.
Figure 2:
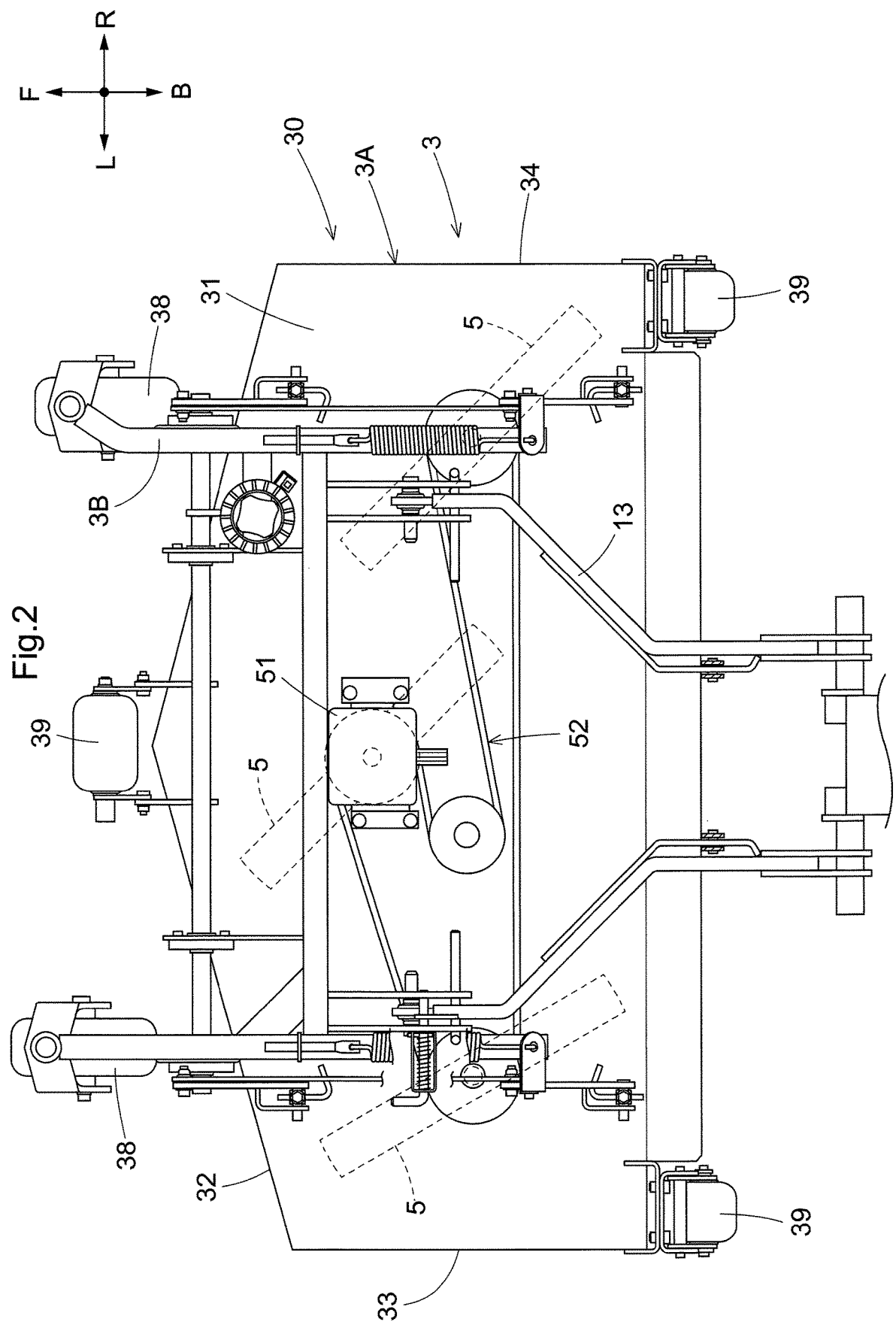
FIG. 2 is a plan view of the mower deck.

In this detailed disclosure, unless indicated explicitly otherwise, the term "front" means the front (or forward) side with respect to the machine body front/rear direction (arrow F in FIG. 1 and FIG. 2), and the term "rear" means the rear side with respect to the machine body front/rear direction (arrow B in FIG. 1 and FIG. 2). Further, the term "left" means the left side in the machine body transversal direction (arrow L in FIG. 2), and the term "right" means the right side in the machine body transversal direction (arrow R in FIG. 2). And, the term "upper" means the upper side in the perpendicular direction of the machine body (arrow U in FIG. 2) and the term "lower" means the lower side in the perpendicular direction of the machine body (arrow D in FIG. 2), these terms respectively showing the relations in the ground clearance.

Next, with reference to the accompanying drawings, a specific embodiment of a mower mounting a mower deck according to the present invention will be explained. FIG. 1 is a side view of the mower, FIG. 2 is a plan view of the mower deck and FIG. 3 is a perspective view showing the mower deck as seen from its bottom face.

This mower includes a vehicle body mounting a pair of left and right front wheels 1 drivably and a pair of left and right rear wheels 2 steerably, and a mower device 3 located on the front side of the vehicle body. At a front portion of the vehicle body, there is formed a riding type driving section 10 having a driver's seat 11 and a steering wheel 12 for steering the rear wheels 2. At a rear portion of the vehicle body, an engine 6 is mounted. Downwardly of the driving section 10, there is provided a speed changer device 60 for speed-changing the power from the engine 6. The speed changer device 60 transmits the power to the front wheels 1 and also to the mower device 3. The mower device 3 is supported to the vehicle body to be liftable up/down via a lift link mechanism 13 which is vertically swung by a hydraulic cylinder.

Figure 3:
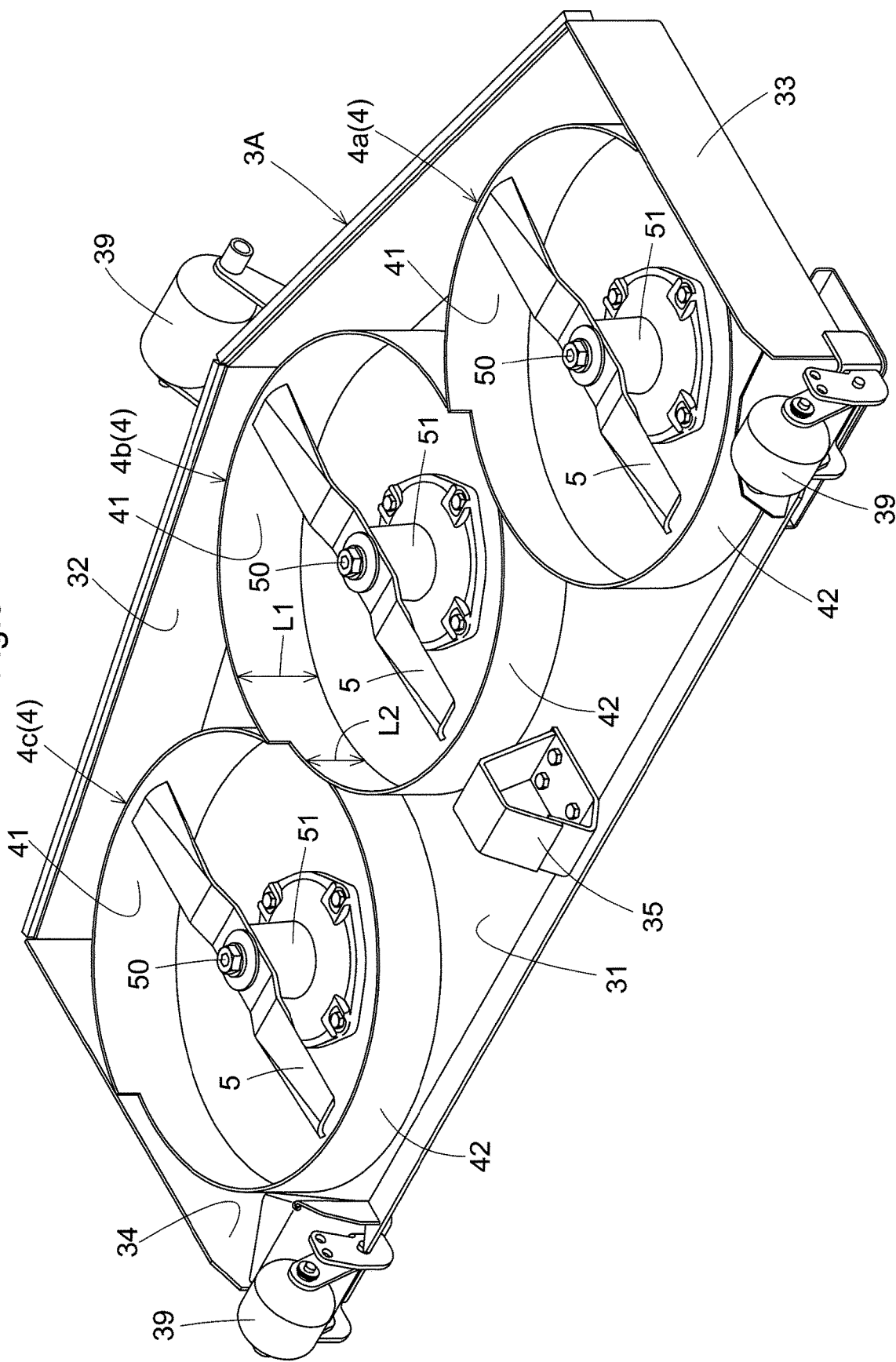
FIG. 3 is a perspective view showing the mower deck as seen from its bottom face.

As shown in FIG. 1, FIG. 2 and FIG. 3, the mower device 3 includes a mower deck 3A and a support frame 3B. The mower deck 3A includes three blades 5 arranged side by side and a housing 30 which covers the blades 5 from above. The housing 30 includes a top wall 31, a front wall 32 extending downwards from the front edge portion of the top wall 31, a left wall 33 extending downwards from the left edge portion of the top wall 31, and a right wall 34 extending downwards from the right edge portion of the top wall 31. Namely, the housing 30 is formed to cover the blades 5 from above. Adjacent a rear center portion of the housing 30, a skid 35 is fixed to the top wall 31.

The support frame 3B is disposed upwardly of the top wall 31 and is connected on one side thereof to the top wall 31 and connected on the other side thereof to the lift link mechanism 13. At the front-end portions of a pair of left and right front/rear frames constituting the support frame 3B, a pair of left and right ground contacting wheels 38 are supported with a predetermined spacing from each other. Further, three auxiliary wheels 39 provided at the front center portion and the rear left and right portions of the mower deck 3A are supported respectively via a bracket to the top wall 31.

Each one of three blades 5 is fixed to a lower end portion of a rotational shaft 50 which is a vertical shaft extending in the vehicle body vertical direction. The rotational shaft 50 extends through the top wall 31 to be rotatably supported by a bearing 51 which is attached to the top wall 31. Each rotational shaft 50 is rotatably driven by a belt transmission mechanism 52 which receives power from the speed changer device 60.

As shown in FIG. 3, a mulching blade rotation space delimited by the outer circumferential area of the rotational paths of the three blades 5 has its lateral side surrounded by a baffle unit 4 and has its upper side surrounded by the top wall 31. Namely, the blade baffle unit 4 and the top wall 31 together create the mulching blade rotation space. The blade baffle unit 4 is bonded to the top wall 31 in abutment therewith and is surrounded by the blade baffle unit 4 extending downwards from the top wall 31. The blade baffle unit 4 consists of a left unit portion 4a which surrounds the rotational path of the left blade 5, a center unit portion 4b which surrounds the rotational path of the center blade 5 and a right unit portion 4c which surrounds the rotational path of the right blade 5. Each unit portion 4a, 4b, 4c can be sectioned into a front baffle 41 and a rear baffle 42. The front baffle 41 has a semi-arcuate cross section extending along the front half portion of the rotational path of the blade 5 and the rear baffle 42 has a semi-arcuate cross section extending along the rear half portion of the rotational path of the blade 5.

As the rotational path of each blade 5 is surrounded by the respective unit portion 4a, 4b, 4c, this mower deck 3A functions as a mulching type which cuts cut grass pieces by a plurality of times with the blades 5.

Figure 4:
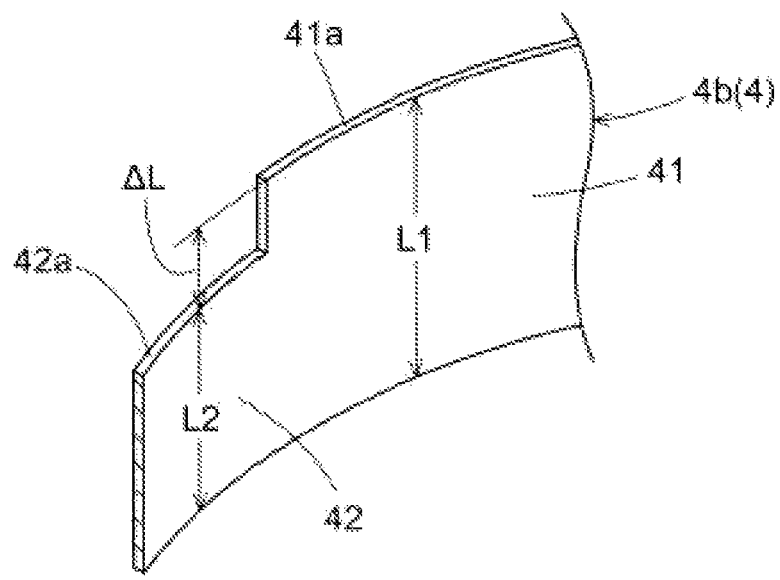
FIG. 4 is an enlarged view showing a vertical length difference between a front baffle and a rear baffle.

As shown in the enlarged view in FIG. 4, a length: L1 of the front baffle 41 from its upper end bonded to the top wall 31 to its lower end 41a is longer than a length: L2 of the rear baffle 42 from its upper end bonded to the top wall 31 to its lower end 42a. Namely, the front baffle 41 has a length (width) with which its lower end 41a reaches the vicinity of the ground surface in order to prevent discharge of cut grass pieces via this lower end 41a. Whereas, the rear baffle 42 has such a length that just allows discharging of cut grass pieces via its lower end 42a. In this regard, it is important that the distance between the lower end 42a and the ground surface be not too large. For, if the distance between the lower end 42a and the ground surface were too large, the cut grass pieces would be discharged to the rear side by a strong air current, thereby creating a conspicuous streak on the mowing marks.

For this reason, in the instant embodiment, the length: L2 of the rear baffle 42 is set shorter by: Δ L=10 millimeters–30 millimeters, preferably, Δ L=15 millimeters–25 millimeters, than the length: L1 of the front baffle 41. With this arrangement, a favorable mulching performance can be obtained by the front baffle 41 and the rear baffle 42 and also a portion of the mulched cut grass pieces can be discharged via the lower end 42a of the rear baffle 42 by such a degree as not to leave any conspicuous streak on the mowing marks.

Figure 5:
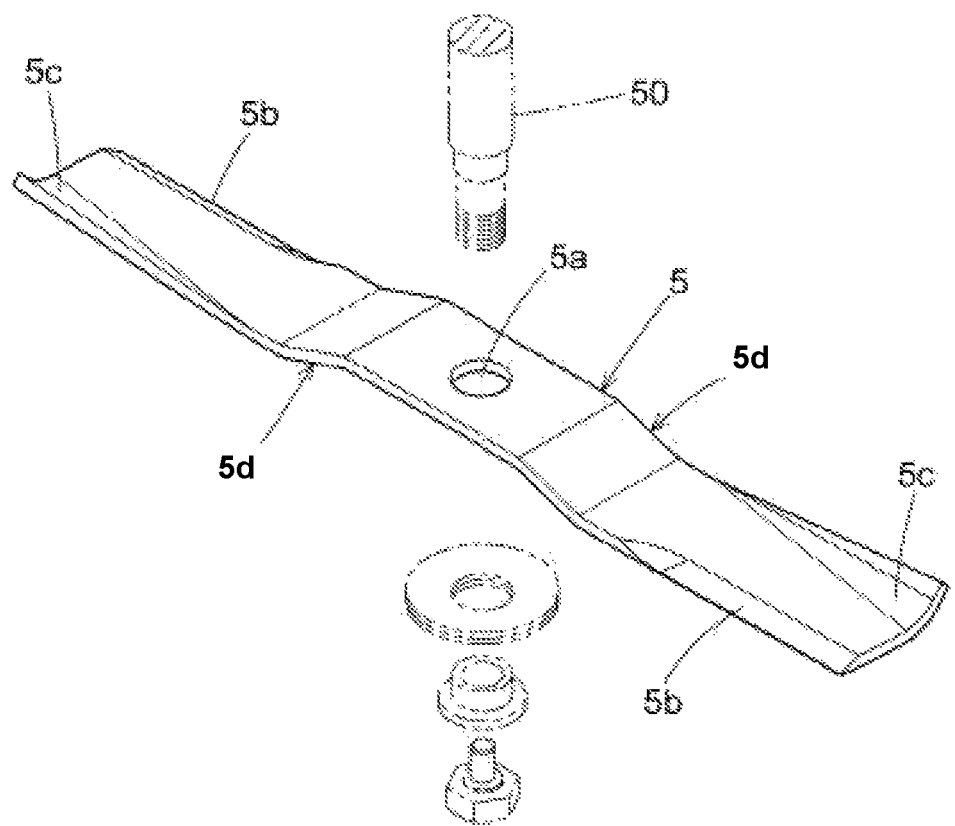
FIG. 5 is a perspective view of a blade.

Each blade 5, as shown in FIG. 5, is constituted of a flat plate which defines at its center area a center hole 5a for allowing insertion of the lower end of the rotational shaft 50 as a vertical shaft. The blade 5 is bolt-coupled with the rotational shaft 50. The blade 5 is bent in two steps with a small bending angle to form stepped portions 5d. With this, when the blade 5 is attached to the rotational shaft 50, its outer end areas will be positioned lower than its center area.

Cutting edges 5b are formed to extend from the outer end areas on the opposed sides of the blade 5 to the positions before the stepped portions 5d. Namely, each cutting edge 5b is formed with a length which is equal to or greater than ⅕ of the total length of the blade 5, preferably, by a length of about ¼ thereof. At the corner portion in the outer end area opposite to the cutting edge 5b, there is formed a wind generating portion 5c. The wind generating portion is bent upwards to present a triangular shape with its vertex being formed of the outer end corner portion.

Figure 6:
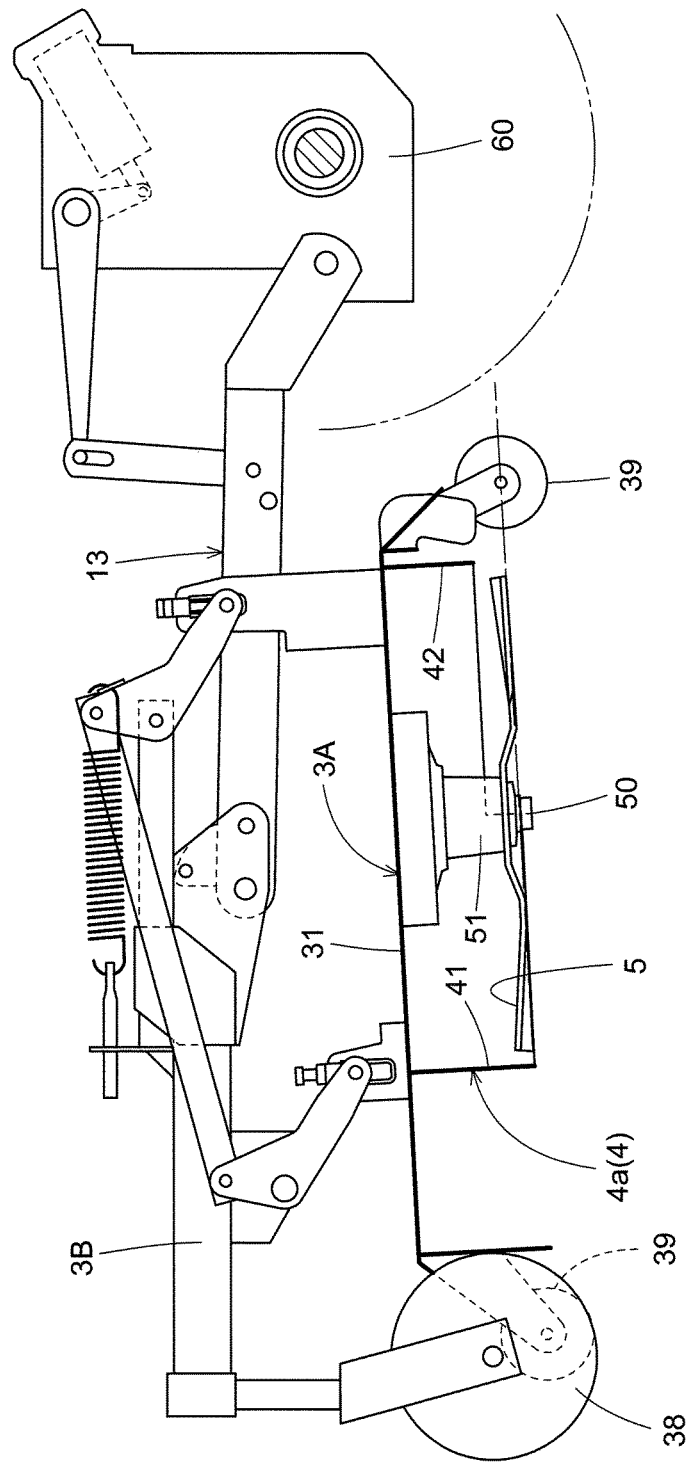
FIG. 6 is a side view in partial section of the mower deck.

With the mower deck 3A according to the instant embodiment, the amount of cut grass pieces discharged from the rear side of the mower deck 3A is smaller in comparison with such amounts provided by the mower decks according to the detailed disclosure of the U.S. Pat. No. 6,681,553 and the detailed disclosure of the E.P. Application Publication No. 3329759. However, depending on a growth state of grass to be cut (mowed) or a mode of cutting (mowing), there can be obtained greater uniformity in the mowing marks with increase in the rear discharging amount of cut grass pieces. For this reason, in the instant embodiment, as shown in FIG. 6, the lift amount by the lift link mechanism 13 can be set in order that the rear end of the rotational path of the blade 5 may be elevated higher relative to its front end, at the time of a grass cutting posture where the ground contacting wheels 38 are placed in contact with the ground surface. More particularly, in the instant embodiment, the lift amount by the lift link mechanism 13 can be set in order that the rear end of the rotational path of the blade 5 may be set higher by several millimeters to about ten millimeters, e.g. by 2 millimeters to 12 millimeters, preferably, 4 millimeters to 8 millimeters approximately, than the front end of the rotational path of the blade 5.

In the foregoing embodiment, the mower deck 3A includes three blades 5. However, the number of blades 5 can be equal to or fewer than 2, or equal to or greater than 4. Further, the mower deck 3A may be mounted not at the front portion of the traveling vehicle, but at a center portion thereof, namely, between the front wheels 1 and the rear wheels 2.

The present invention is applicable to a mower deck configured to cover a rotary blade from above as well as to a mower mounting such mower deck. Incidentally, it is understood that the arrangements disclosed in the foregoing embodiment (including the further embodiments) may be used in combination with the arrangements disclosed in the other embodiments as long as no contradiction results from such combination. Also, the embodiments disclosed in this detailed disclosure are only illustrative and embodiments of the present invention are not limited thereto, and various modifications thereof will be possible within a range not departing from the essence and objects of the present invention.

The invention claimed is:

1. A mower deck to be mounted on a traveling vehicle, the mower deck comprising:
   a housing having a top wall linked and jointed, via a lift link mechanism, to a support frame having a left and right pair of longitudinal frames extending along a direction in which the travel vehicle travels and a crossbeam which connects the left longitudinal frame with the right longitudinal frame;
   at least one blade rotated downwardly of the top wall and about a vertical shaft; and
   a blade baffle unit extending downwards from the top wall in such a manner as to surround an outer circumferential area of a rotational path of the blade to create therein a mulching blade rotation space, the blade baffle unit having a front baffle located on an advancing side of the traveling vehicle and a rear baffle located on a reversing side of the traveling vehicle
   wherein the front baffle extends downwards from and is permanently affixed to the top wall to exceed the rotational path so as to prevent discharge of cut grass pieces via a lower end of the front baffle, wherein the rear baffle extends downwards from and is permanently affixed to the top wall by such an extent to allow discharge of the cut grass pieces, wherein, under a grass cutting posture in which a pair of left and right ground contacting wheels held by the left and right pair of longitudinal frames are placed in contact with the ground surface and supported in suspension by the traveling vehicle via the lift link mechanism, the lift link mechanism can set a lift amount such that a rear end of the rotational path of the blade may be set higher than a front end thereof by 2 millimeters to 12 millimeters, and wherein the pair of left and right ground contacting wheels are held by the left and right pair of longitudinal frames in such a manner that the pair of left and right ground contacting wheels are placed forward of the housing.

2. The mower deck of claim 1, wherein the length of the rear baffle from the lower end to the top wall is set shorter by 10 millimeters to 30 millimeters than the length of the front baffle from the lower end to the top wall.

3. The mower deck of claim 2, wherein the length of the rear baffle from the lower end to the top wall is set shorter by 15 millimeters to 25 millimeters than the length of the front baffle from the lower end to the top wall.

4. The mower deck of claim 1, further comprising:
a pair of left and right ground contacting wheels provided at a front edge of the housing with a predetermined spacing therebetween; and
a single skid provided at a left/right center position of a rear edge of the housing.

5. The mower deck of claim 1, wherein:
the blade is constituted of a flat plate;
a cutting edge having a length which is equal to or more than $\frac{1}{5}$ of the length of the blade is formed from respective outer ends on the opposed sides of the blade toward the vertical shaft; and
on the opposite side of the cutting edge of the blade, there is formed a wind generating portion which is bent upwards to present a triangular shape.

* * * * *